(12) United States Patent
Bessenet et al.

(10) Patent No.: US 11,027,999 B2
(45) Date of Patent: Jun. 8, 2021

(54) ENHANCED PROCESS FOR SELECTIVE SALT RECOVERY FROM WASTEWATER, WASTE SALTS, AND BRINES

(71) Applicant: Veolia Water Technologies, Inc., Moon Township, PA (US)

(72) Inventors: Sebastien Bessenet, Naperville, IL (US); Timothy J. Rittof, West Chicago, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 121 days.

(21) Appl. No.: 16/550,805

(22) Filed: Aug. 26, 2019

(65) Prior Publication Data

US 2019/0382291 A1 Dec. 19, 2019

Related U.S. Application Data (63) Continuation of application No. 15/660,136, filed on Jul. 26, 2017, now Pat. No. 10,427,964.
(Continued)

(51) Int. Cl.
*C02F 9/00* (2006.01)
*B01D 9/00* (2006.01)
(Continued)

(52) U.S. Cl.
CPC .............. *C02F 9/00* (2013.01); *B01D 9/0004* (2013.01); *B01D 9/0031* (2013.01);
(Continued)

(58) Field of Classification Search
CPC .... C02F 1/52; C02F 1/04; C02F 1/048; C02F 1/283; C02F 1/442; C02F 9/00; C02F 2103/365; C02F 2001/5218; C02F 2101/101; C02F 2101/12; B01D 9/0004; B01D 9/0059; B01D 9/0031; C01D 3/06; C01D 5/16
See application file for complete search history.

(56) References Cited

FOREIGN PATENT DOCUMENTS

| CN | 102849885 A | 1/2013 |
|---|---|---|
| CN | 104030319 A | 9/2014 |

(Continued)

OTHER PUBLICATIONS

International Search Report dated Sep. 21, 2017 in re International Application No. PCT/US2017/044072 filed Jul. 27, 2017.
(Continued)

*Primary Examiner* — John Kim
(74) *Attorney, Agent, or Firm* — Coats & Bennett PLLC (57) ABSTRACT

A process for treating wastewater or waste brines that include sodium and chloride ions. The waste brine is concentrated and thereafter directed to a Mirabilite crystallizer that produces hydrated sulfate salt crystals and a first solution. The hydrated crystals are melted to form an aqueous sulfate solution that is directed to a sodium sulfate crystallizer which produces sodium sulfate salt crystals. The first solution produced by the Mirabilite crystallizer is directed to a nanofiltration device which produces a permeate stream and a reject stream containing sulfate removed by the nanofiltration device. The permeate stream is directed to a sodium chloride crystallizer that produces sodium chloride salt crystals. The reject stream is recycled to the Mirabilite crystallizer.

4 Claims, 5 Drawing Sheets

Related U.S. Application Data (60) Provisional application No. 62/367,671, filed on Jul. 28, 2016.

(51) Int. Cl.
    *C02F 1/04*     (2006.01)
    *C02F 1/28*     (2006.01)
    *C02F 1/44*     (2006.01)
    *C01D 5/16*     (2006.01)
    *C01D 3/06*     (2006.01)
    *C02F 1/52*     (2006.01)
    *C02F 101/10*     (2006.01)
    *C02F 101/12*     (2006.01)
    *C02F 103/36*     (2006.01)

(52) U.S. Cl.
    CPC .............. *B01D 9/0059* (2013.01); *C01D 3/06* (2013.01); *C01D 5/16* (2013.01); *C02F 1/048* (2013.01); *C02F 1/283* (2013.01); *C02F 1/442* (2013.01); *C02F 1/52* (2013.01); *C02F 1/04* (2013.01); *C02F 2001/5218* (2013.01); *C02F 2101/101* (2013.01); *C02F 2101/12* (2013.01); *C02F 2103/365* (2013.01)

(56) References Cited

FOREIGN PATENT DOCUMENTS

| | | |
|---|---|---|
| CN | 104692574 A | 6/2015 |
| CN | 105254106 A | 1/2016 |
| CN | 105254141 A | 1/2016 |
| CN | 205387520 U | 7/2016 |
| RU | 2129995 C1 | 5/1999 |

OTHER PUBLICATIONS

Xu, Xiao-hui, "Chemical Engineering and Production Technology of Salts", Jan. 31, 2014, pp. 1-12, Central TV Broadcasting University Press.

CN Search Report dated Oct. 22, 2019 in re CN Application No. 2017800000860.7 filed Aug. 22, 2017.

ENHANCED PROCESS FOR SELECTIVE SALT RECOVERY FROM WASTEWATER, WASTE SALTS, AND BRINES

CROSS-REFERENCE TO RELATED APPLICATION

The present application is a continuation of U.S. patent application Ser. No. 15/660,136 filed Jul. 26, 2017, now U.S. Pat. No. 10,427,964, which claims priority under 35 U.S.C. § 119(e) from U.S. application Ser. No. 62/367,671 filed on Jul. 28, 2016. These applications are incorporated in their entirety by reference herein.

FIELD OF THE INVENTION

The present invention relates to processes wherein sulfate and chloride salts are recovered from wastewater, mixed salts and brines.

BACKGROUND

Wastewater streams often contain appreciable amounts of various salts. Because an increasing number of countries are passing laws to regulate wastewater disposal, it is often difficult or problematic to dispose of contaminated wastewater. Further, mixed salts are often subject to strict regulations on disposal as well. Therefore, to simplify the disposal of wastewater, it is necessary to selectively remove the contaminants in a cost-effective way. Some salts, such as sodium chloride and sodium sulfate, have value if they can be recovered with a relatively high purity and in a cost effective way. But the challenge is meeting both of those requirements.

Therefore, there is a need for an efficient and cost effective process for treating waste streams and brines that contain sulfate and chloride by removing both sulfate and chloride and at the same time producing sodium sulfate and sodium chloride of a relatively high purity that enables them to be sold.

SUMMARY OF THE INVENTION

One embodiment of the present invention relates to a method for separating sulfate from a wastewater or brine stream containing sulfate and chloride and recovering a high purity sodium chloride salt along with valuable sodium sulfate salt. A nanofiltration device or other membrane separation device is operatively associated with a sodium chloride salt crystallizer and a hydrous salt crystallizer. In one embodiment, wastewater directed to the sodium chloride salt crystallizer is filtered by the nanofiltration device that is located upstream of the sodium chloride salt crystallizer and which removes sulfate, organics and other selected pollutants. This enables the downstream sodium chloride crystallizer to produce the high purity sodium chloride salt. Reject from the nanofiltration device, including sulfate, organics and other pollutants, is cycled to the hydrous salt crystallizer that produces hydrated sulfate salt which is further treated to produce sodium sulfate salt.

The use of the nanofiltration device within the salt recovery process enhances sulfate depletion in addition to facilitating hydrated salt crystallization. Further, employing the nanofiltration device permits increasing the operating temperature at which the hydrated sulfate salt is produced while still achieving high sulfate rejection in the process. The nanofiltration device allows cycling the potential pollutants and organics to the hydrous salt crystallizer which is less sensitive to coloration and purity constraints. The enhanced sulfate depletion allows relatively high concentration factors to be employed by the sodium chloride crystallizer which reduces liquor recycling rate and associated energy costs. The lower sulfate and pollutant content in the wastewater stream directed to the sodium chloride crystallizer permits the process to achieve higher chloride salt purity without requiring the use of the recrystallization unit.

In another embodiment, the present invention includes a coal-to-chemical or coal-to-liquid process. In the process of converting coal-to-chemical or coal-to-liquid, a wastewater stream is produced. The wastewater stream includes at least one alkali metal, sulfate and chloride. The method includes converting coal-to-chemical or liquid and producing the wastewater stream. The wastewater stream is pre-treated and the pre-treated wastewater may be concentrated. After pre-treating the wastewater stream, the process entails splitting the wastewater stream into a first effluent and a second effluent. In addition, the process entails removing sulfate from the first effluent by directing the first effluent to a nanofiltration device and filtering the first effluent to produce a permeate stream and a reject stream wherein the reject stream contains the sulfate removed from the first effluent. The permeate stream is directed to a chloride crystallizer which produces chloride salt crystals comprising chloride and at least one alkali metal. The reject stream produced by the nanofiltration device may be mixed with the wastewater stream upstream of the nanofiltration device. The second effluent is directed to a sulfate crystallizer and the method includes producing sulfate salt crystals that comprise sulfate and at least one alkali metal.

In another embodiment, the present invention entails a process for converting coal-to-chemical or converting coal-to-liquid. In this process, a waste brine is ultimately produced and the waste brine includes an alkali metal, sulfate and chloride. This method and process entails concentrating the waste brine and directing the concentrated waste brine to a Mirabilite crystallizer and through a cooling crystallization process producing hydrated sulfate salt crystals and a chloride-rich brine stream. The method includes separating the hydrated sulfate salt crystals from the chloride-rich brine stream. Further, the hydrated sulfate salt crystals are melted to form an aqueous sulfate solution or slurry. This aqueous sulfate solution or slurry is directed to a sulfate crystallizer and the method entails crystallizing anhydrous sulfate salts from the aqueous sulfate solution or slurry to form sulfate salt crystals comprising sulfate and at least one alkali metal. Further, the process entails removing sulfate and suspended solids from the chloride-rich brine stream produced by the Mirabilite crystallizer by directing the chloride-rich brine stream through a nanofiltration device which produces a permeate stream and a reject stream. The reject stream contains the sulfate removed from the chloride-rich brine stream. Further, the process entails directing the permeate stream to a chloride crystallizer and producing chloride salt crystals comprising chloride and at least one alkali metal. The reject stream produced by the nanofiltration device is recycled to the Mirabilite crystallizer and mixed with the waste brine directed into the Mirabilite crystallizer.

Other objects and advantages of the present invention will become apparent and obvious from a study of the following description and the accompanying drawings which are merely illustrative of such invention.

DESCRIPTION OF EXEMPLARY EMBODIMENTS

The present invention entails a process for recovering high purity or commercial purity saleable salts from wastewater, waste salts, naturally produced brines and processed brines. The process removes desirable salts such as sulfate and chloride salts. As discussed below, the system and process includes a nanofiltration membrane unit operatively associated with other types of process units, such as salt crystallizers, that make up a salt recovery system with enhanced performance.

Figure 1:
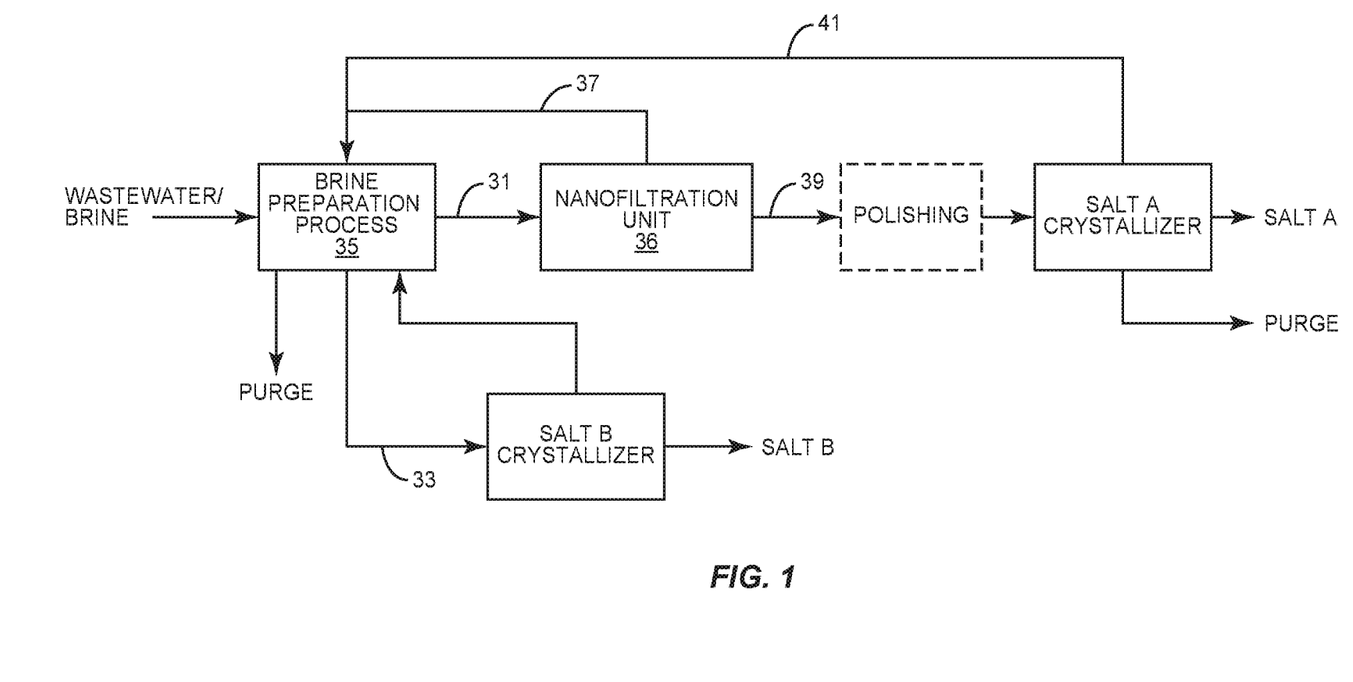
FIG. 1 is a schematic illustration of the basic principles of the present invention.

One embodiment of the present invention is shown in FIG. 1. Here a wastewater stream, such as a brine feed, is directed to a brine preparation process 35. As used herein, the terms wastewater stream, waste brine stream, and brine feed are all meant to mean a waste stream and are used interchangeably herein. Brine preparation process 35 can vary depending on the nature of the wastewater or brine feed and the aim of the process as a whole. For example, in some cases the brine preparation process 35 may dissolve salt from an upstream process. In other cases, the brine preparation process 35 may constitute a concentration process such as performed by a membrane concentration unit and/or a crystallizer or evaporator that is designed to remove one or more selected contaminants and in the process the feed is concentrated. As noted above, there is a wide variety of brine preparation or pre-treatment processes that can be carried out.

In the FIG. 1 process, there are two effluent streams, streams 31 and 33, produced by the brine preparation process 35. Effluent stream 31 is directed to a nanofiltration unit 36. In the case of this embodiment, nanofiltration unit 36 is selected to preferentially reject divalent anions such as sulfate. In addition, in this embodiment the nanofiltration unit 36 splits the monovalent anions between the reject stream 37 and the permeate stream 39 produced by the nanofiltration unit. This split can be based on size, molecular weight and process conditions for example. It is appreciated that the nanofiltration unit 36 is a pressure-driven system that forces the effluent stream 31 through membranes forming a part of the nanofiltration unit 36. It follows that the pressure must be sufficient to overcome the osmotic pressure difference between the rejected and concentrated streams.

Reject stream 37 produced by the nanofiltration unit 36 is recycled back to the brine preparation process 35 for further treatment. In some cases, reject stream 37 or a portion thereof can be directed to other treatment processes. However in the case of one embodiment, the divalent anions and some monovalent anions contained in the rejection stream 37 are recycled back to the brine preparation process, causing the concentration of these anions to increase upstream of the nanofiltration unit 36 for allowing higher separation and recovery efficiency through the brine separation process 35.

Permeate stream 39, produced by the nanofiltration unit 36 and which typically includes an alkali metal such as sodium, is directed to salt A crystallizer. Permeate from the nanofiltration unit 36 is subjected to a crystallization process and produces a high purity salt. In addition, the salt A crystallizer produces a concentrate that is recycled via line 41 back to the brine preparation process 35. Salt A crystallizer also potentially produces a purge.

Effluent stream 33, produced by the brine preparation process, is directed to a salt B crystallizer. Here the effluent stream 33 is subjected to a crystallization process in salt B crystallizer and produces a salt that is referred to as salt B. Salt B crystallizer also produces a concentrate or mother liquor that is recycled back to the brine preparation process 35.

It is appreciated by those skilled in the art that the system and process shown in FIG. 1 can be used to remove various contaminants from the brine feed and at the same time recover various salts. For example, in one example the brine feed is rich in sodium sulfate and sodium chloride. In this example, the process produces sodium sulfate as salt B and sodium chloride as salt A.

Figure 2:
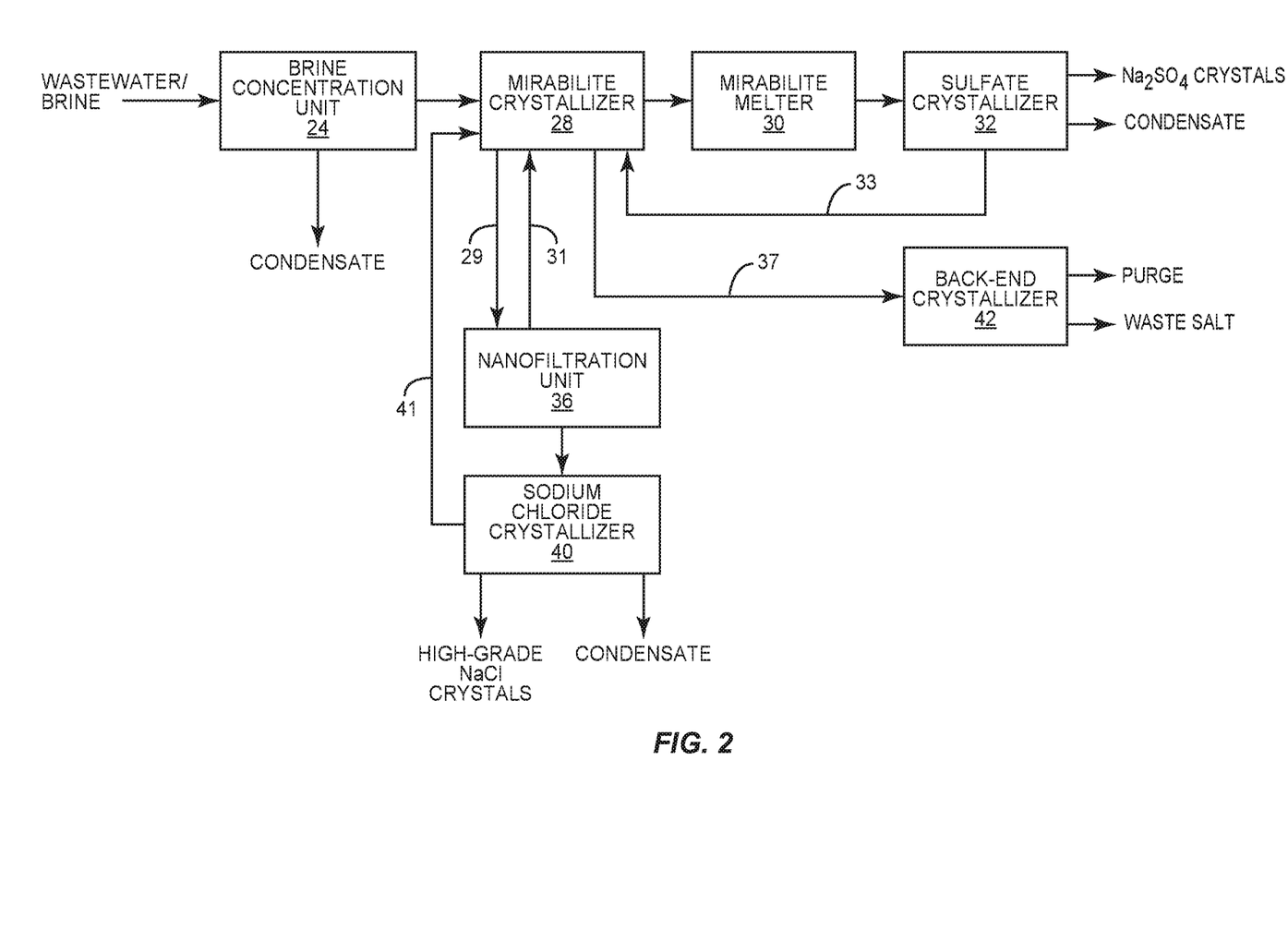
FIG. 2 is a schematic diagram showing an exemplary method for recovering sulfate and chloride salts.

Another exemplary embodiment is shown in FIG. 2. A feed of wastewater or brine containing sodium, chloride, sulfate, and other contaminants enters the system and is directed to a brine concentration unit 24. Various types of concentration units can be employed, such as evaporators, membrane filtration devices, and other types of filtration devices. Concentrating the influent stream permits the saturation or near saturation of sulfate salts. This concentrated brine is then directed to a Mirabilite crystallizer 28, where sodium sulfate decahydrate is formed via cooling crystallization. The sodium sulfate decahydrate is separated from a sodium chloride rich brine stream 29.

The hydrated sulfate salt is directed to a Mirabilite melter 30, where it is heated to form an aqueous solution or slurry. The aqueous solution is directed into a sulfate crystallizer 32, where it is processed to form anhydrous $Na_2SO_4$ as desired. Remaining brine is recycled to the Mirabilite crystallizer 28 via line 33.

The sodium chloride rich brine stream 29 produced by the Mirabilite crystallizer 28 is directed to a nanofiltration unit 36. The nanofiltration process removes sulfate from the sodium chloride rich stream 29. In addition, the nanofiltration process removes total suspended solids, organics and other pollutants from the sodium chloride rich brine stream 29. Because the nanofiltration process decreases sulfate content, it allows for higher chloride salt concentrations, a more reasonable operating temperature (−5 to 20° C. for the Mirabilite crystallizer), and a general reduction in the recycle 41 from the sodium chloride crystallizer 40 to the Mirabilite crystallizer 28. Therefore, overall costs of operation associated with utilities such as pumping, heating, and cooling are reduced. Reject stream 31 from the nanofiltration unit 36 returns to the Mirabilite crystallizer 28, where more sulfate may be recovered and pollutants may be processed. Portions of the reject stream 31 and/or portions of the brine in the Mirabilite crystallizer 28 can be purged. In one embodiment, as illustrated in FIG. 2, a purge line 37 extends from the Mirabilite crystallizer 28 to a back-end crystallizer 42. The back-end crystallizer 42 can produce a waste salt and a purge stream or only waste salts. Previous processing ensures that the volume of final purge and/or waste salt is reduced, thus minimizing disposal costs.

The sodium chloride rich brine (permeate) from the nanofiltration unit 36 is directed to a sodium chloride crystallizer 40. This unit processes the brine to produce sodium chloride salt. At this point in the process, the produced sodium chloride salt is considered high grade (commercial) and saleable, and may not require further processing (e.g., recrystallization). Remaining brine is recycled to the Mirabilite crystallizer 28 via line 41.

When the process applies to waste streams containing organics of which a portion would pass through the nanofiltration membrane, an additional polishing process step (shown in dotted lines in FIG. 1) can be installed upstream of the sodium chloride crystallizer 40 to remove the residual organics in the permeate.

Figure 3:
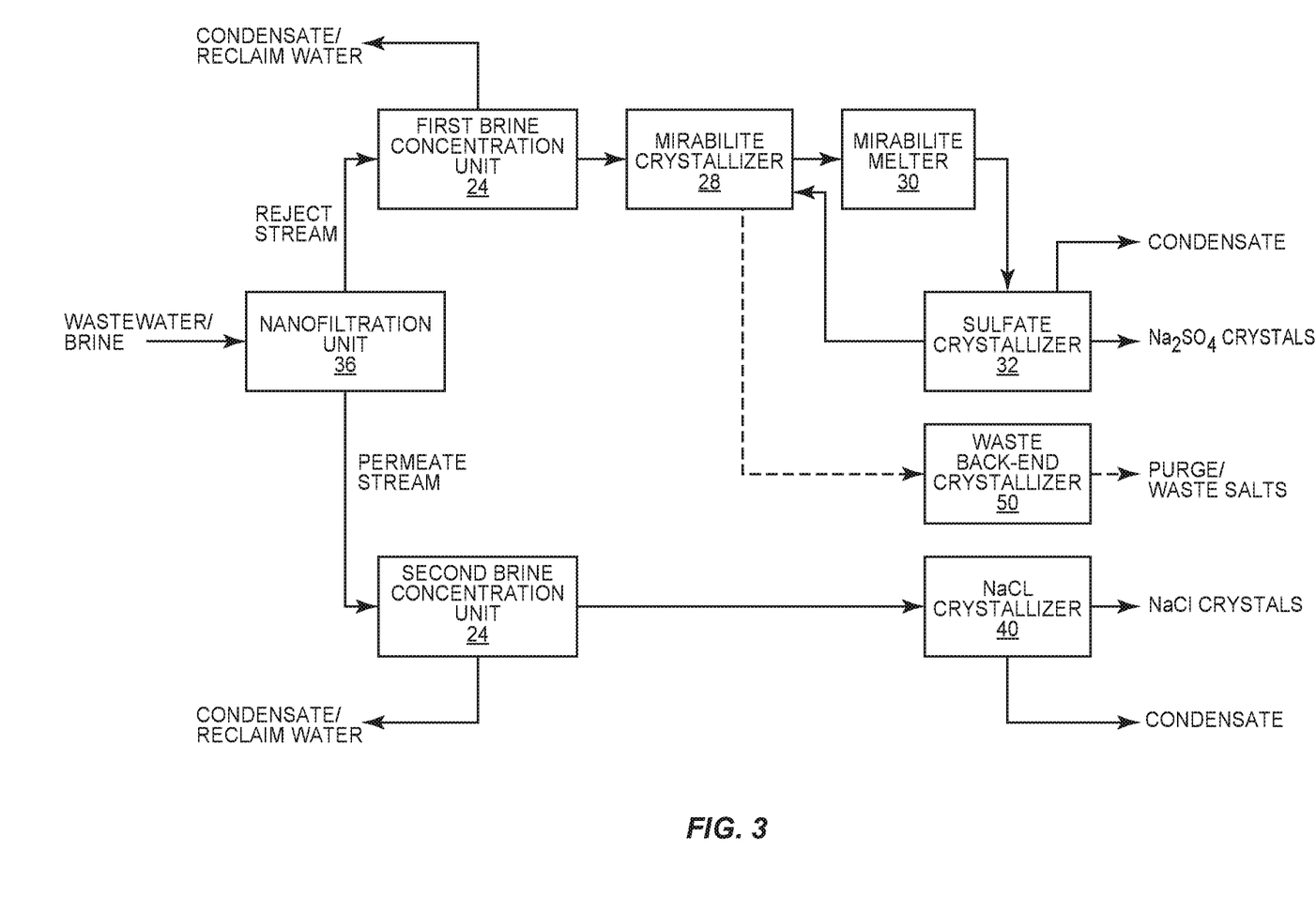
FIG. 3 is a schematic diagram depicting an alternate process for recovering sulfate and chloride salts.
Figure 4:
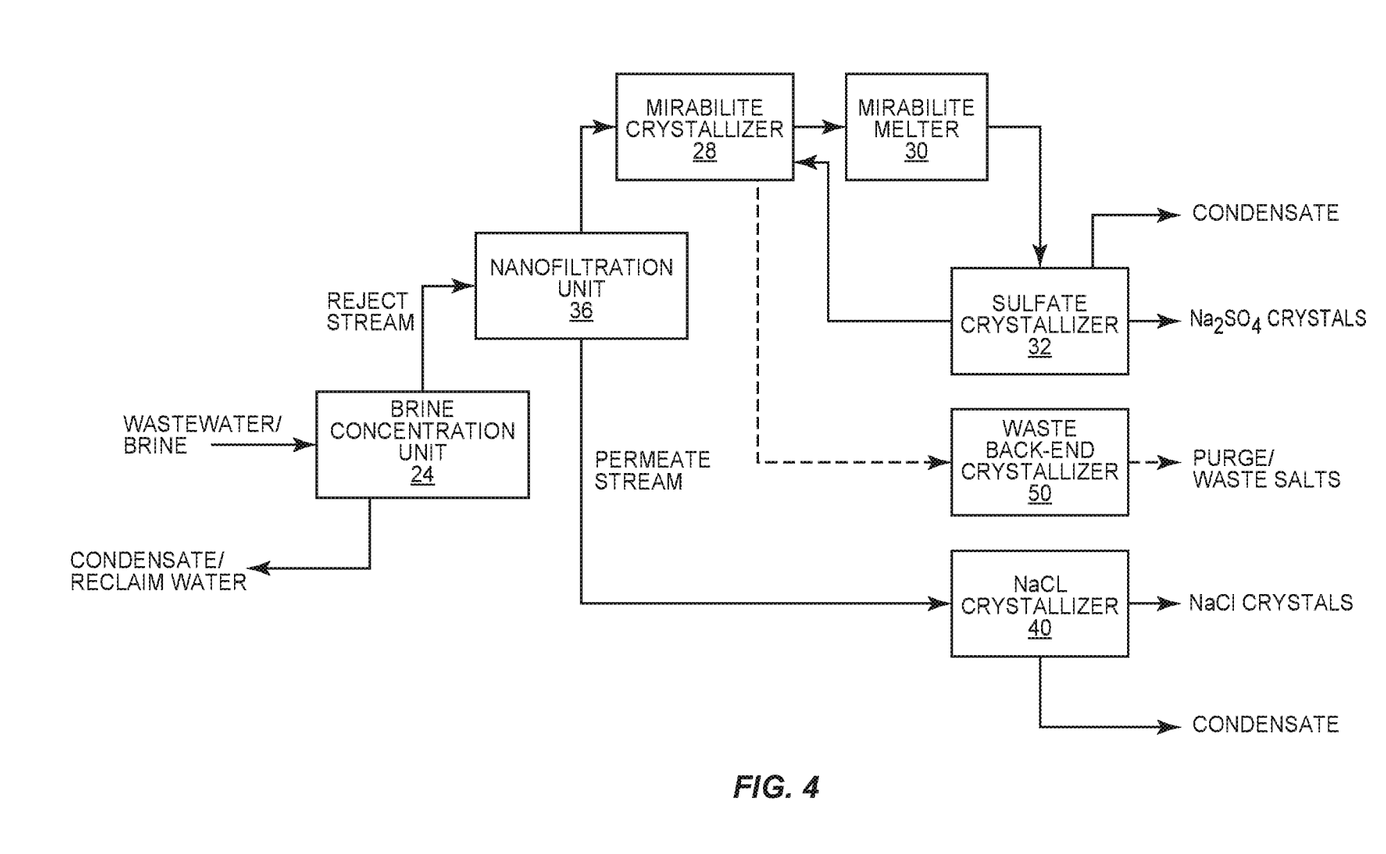
FIG. 4 is another schematic diagram showing yet another alternative process for recovering sulfate and chloride salts.

There are many variations to the processes shown in FIGS. 1 and 2. FIGS. 3 and 4 show other exemplary variations where the nanofiltration unit 36 can be placed in earlier stages of the process when specific process conditions so dictate. For example, variations such as shown in FIGS. 3 and 4 may be appropriate where there is lower salt recovery constraints, higher viscosity in concentrated phases, etc. These variations allow, for example, the ability to operate the nanofiltration device in better conditions while reducing the recycle possibilities between downstream process units. As shown in FIG. 3, the nanofiltration membrane unit 36 splits the main stream into reject and permeate streams before concentration and both streams are further concentrated separately by an adequate process and further processed through the same process units present in FIG. 2. With particular reference to FIG. 3, the reject stream from the nanofiltration unit 36 is directed to a first brine concentration unit 24. The concentrated reject stream is then directed to the Mirabilite crystallizer 28 and the process proceeds as described above. The permeate stream produced by the nanofiltration unit 36 is directed to a second brine concentration unit 24. After treatment in the brine concentration unit 24, the concentrated permeate stream is directed to the sodium chloride crystallizer 40 which produces the sodium chloride crystals.

In another alternative design (FIG. 4), the wastewater or brine is first directed into a brine concentration unit 24 which concentrates the wastewater or brine. The effluent from the brine concentration unit 24 is directed to the nanofiltration unit 36 which again produces a reject stream and a permeate stream. In this case, the reject stream from the nanofiltration unit 36 is directed to the Mirabilite crystallizer 28 and the process proceeds as discussed above. The permeate stream produced by the nanofiltration unit 36 is directed to the sodium chloride crystallizer 40 which, as discussed above, produces the sodium chloride crystals.

There are many applications for the processes shown in FIGS. 1-4. In one embodiment, the process of the present invention is employed for treating wastewater from a coal-to-chemical or a coal-to-liquid process. In this case, coal is converted to a chemical or liquid and a wastewater is produced. The wastewater is concentrated to form a salt solution that typically contains an alkali metal, chloride and sulfate ions. The nanofiltration process discussed above is incorporated into a system including the components shown in FIGS. 1-4 in order to decrease the sulfate concentration in the concentrated brine and at the same time remove high purity sulfate and chloride salts.

Typically, a coal-to-chemical or coal-to-liquid process gasifies coal to produce syngas. In one example, this gasification occurs when pulverized coal and hydrogen gas, as well as recycled coal-derived liquids are mixed with a catalyst to produce a crude gas. See FIG. 5. This may occur under pressurized gasification conditions. Crude gas may then be refined into synthetic gasoline, diesel, or other hydrocarbon products. In one refining process, the crude gas is contacted with water to cool the gas. The cooling allows a product to be obtained with a gas and liquid phase product. Oil may be separated from the liquid phase, leaving coal gasification wastewater. The wastewater may then be subjected to supercritical conditions and contacted with oxidants, such as organics and ammonia nitrogen, to obtain synthesis gas. After gasification, the products produced may be subjected to additional treatment. For example, in some indirect coal conversion methods, after gasification, the syngas is subjected to Fischer-Tropsch Synthesis, which produces products as well as steam and tail gas that may be used to generate electric power. Wastewater is produced in various places along a coal-to-chemical or coal-to-liquid process and contains alkali metals (typically sodium), sulfate, and chloride. During the gasification stage, wastewater is produced when water is used to convey slag and flyash from gasifier, to scrub particulates and chlorides from the syngas, and to process condensate from cooling the syngas. This wastewater typically contains chloride, ammonia, cyanides, and flyash. Wastewater is also produced in Fischer-Tropsch Synthesis, which typically contains oxygenated hydrocarbons and toxic metals. Additional processing of the Fischer-Tropsch Synthesis may produce additional wastewaters with organics, cyanides, ammonia, and phenol contaminants. Although these are examples of coal-to-chemical or coal-to-liquid processes, one of skill in the art appreciates that the methods described herein may be used to treat wastewater from any coal-to-chemical or coal-to-liquid process.

Wastewater generated from the conversion of coal to chemicals or fuel in some embodiments is directed to a pre-treatment process or processes. See FIG. 5. The pre-treatment process removes various contaminants and may include one or more traditional pre-treatment methods. For example, pre-treatment may include pH adjustment, membrane filtration (such as, for example, reverse osmosis membrane filtration), ion exchange, chemical treatment such as chemical softening and/or precipitation, or combinations thereof. One of skill in the art appreciates that pre-treatment is not used in some embodiments and, in embodiments where pre-treatment is utilized, the type of pre-treatment may vary due to the contaminants present in the water.

In some cases, the pre-treatment process may include a concentration unit. The concentration unit removes water that may be further treated or released. The remaining contaminants, meanwhile, are concentrated. While various types of concentration units may be used with the present process, in some embodiments the concentration unit is an evaporator that yields blowdown that includes the concentrated wastewater with contaminants. In other embodiments, the concentrator unit may be a reverse osmosis unit that yields a permeate and a reject stream where the reject stream includes the concentrated water with contaminants. In some embodiments using reverse osmosis units, the permeate may be recycled back to the coal-to-chemical or coal-to-liquid process.

The composition of a typical wastewater exiting a concentration unit includes but is not limited to:
sodium ($Na^+$): 0.1-10%, and more often 5-10%
sulfate ($SO_4^{2-}$): 0.1-10%, and more often 7-10%
chloride ($Cl^-$): 0.1-6%, and more often 3-6%
Other constituents such as: silica, organics, potassium, nitrate, ammonia: 1-2%

Table 1 provides three exemplary wastewater concentrations that were treated with the method described herein. Example 1 corresponds to the concentrations found in a high sulfate brine produced in a coal-to-liquid plant. Example 2 corresponds to the concentrations found in a moderate sulfate brine from a coal-to-gas plant. Example 3 corresponds to a low sulfate brine obtained by dissolving salt out of an existing zero liquid discharge Chinese coal-to-chemical plant.

TABLE 1

Exemplary Wastewater Concentrations

|  | Example 1 | Example 2 | Example 3 |
|---|---|---|---|
| alkali metal (sodium) | 2.9% | 1.2% | 8.7% |
| sulfate | 5% | 0.7% | 1% |
| chloride | 0.8% | 1.3% | 13% |

In some embodiments, concentrated wastewater from the concentrator 20 is directed to an organics removal process. Various processes may be utilized to remove organics, such as, for example, filtration, adsorption, chemical treatment, and biological treatment. In one embodiment, the organics removal process comprises treating the concentrated wastewater with activated carbon. One of skill in the art appreciates that organics removal is optional and its use depends on the contaminants found in the wastewater.

Figure 5:
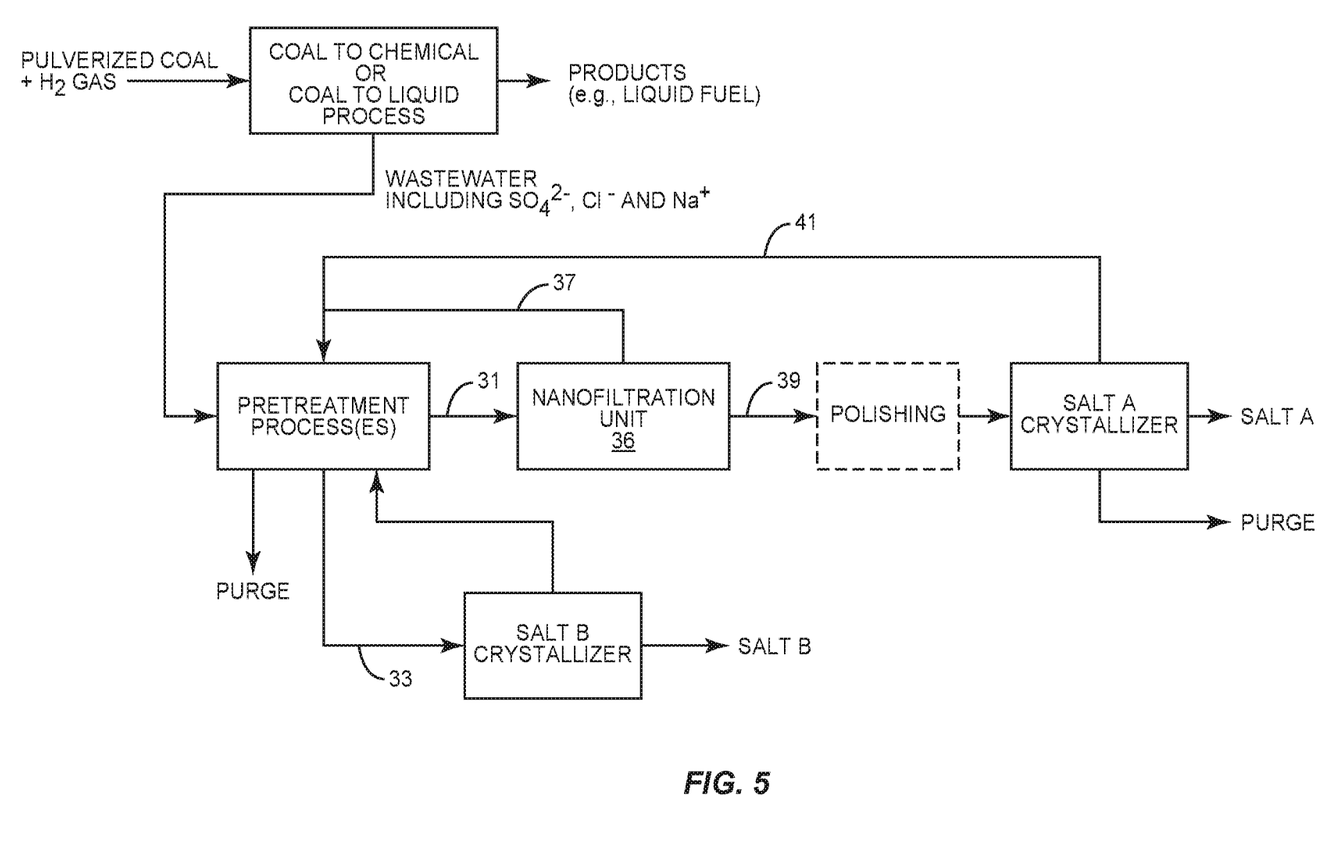
FIG. 5 is a schematic illustration showing a coal-to-chemical or coal-to-liquid process that produces a wastewater stream and which further illustrates recovering sulfate and chloride salts from the wastewater stream.

One particular example of a coal-to-chemical or coal-to-liquid process is shown in FIG. 5. In one example, the pre-treatment process shown in FIG. 5 could, in one embodiment, include suspended solids removal, hardness removal, pH adjustment, etc. Downstream from those processes could be a concentration unit. Downstream of the concentration unit, the process might include a reverse osmosis unit. The reject stream from the reverse osmosis unit may be directed into the nanofiltration unit 36. After the pre-treatment process, the effluent is split into two streams, stream 31 and stream 33. Stream 31 is directed into the nanofiltration unit 36 which produces the reject stream 37 and the permeate stream 39. The permeate stream is treated in the salt A crystallizer as discussed above. The other effluent, effluent stream 33, is directed to the salt B crystallizer and the process proceeds as discussed above. As described above, the salt A crystallizer is a chloride crystallizer and produces chloride salt crystals, such as sodium chloride salt crystals. Salt B crystallizer is a sulfate crystallizer and produces sulfate salt crystals, such as sodium sulfate salt crystals.

The salt recovery process, shown in FIG. 2, can also be employed to treat the wastewater stream produced in the coal-to-chemical or coal-to-liquid process discussed above. In this case the wastewater can be pre-treated as described above and the pre-treated wastewater is directed into the brine concentration unit 24, shown in FIG. 2, and the process proceeds as described above.

Likewise, the wastewater stream produced by the coal-to-chemical or coal-to-liquid process can, after pre-treatment, be treated in the salt recovery process shown in FIG. 3. Here again, after pre-treatment, the wastewater stream is directed into the nanofiltration unit 36, which in turn produces the reject stream and the permeate stream. As described above, the reject stream is directed into the first brine concentration unit 24 and the permeate stream is directed into the second brine concentration unit 24, and the second recovery process proceeds as described above.

Finally, the salt recovery process shown in FIG. 4 can be employed to recover salt crystals from the wastewater stream produced by the coal-to-chemical or coal-to-liquid process described above. Here again, after pre-treatment, the wastewater stream is directed into the brine concentration unit 24 in FIG. 4. The concentrated wastewater from brine concentration 24 is directed to the nanofiltration unit 36 and the process proceeds as described above.

The terms "high purity" and "saleable" are used herein to characterize the recovered chloride salt crystals and the sulfate salt crystals in some embodiments. Both "high purity" and "saleable" when referring to chloride salt crystals or sulfate salt crystals means that the salt crystals are at least 95% pure.

Although the present methods and processes have been shown and described in detail with respect to particular exemplary embodiments, it should be understood by those skilled in the art that it is not intended to limit the methods or processes to the embodiments, since various modifications, omissions, and additions may be made to the disclosed embodiment without materially departing from the novel teachings and advantages described herein.

The present invention may be carried out in other ways than those specifically set forth herein without departing from essential characteristics of the invention. The present embodiment is to be considered in all respects as illustrative and not restrictive, and all changes coming within the meaning and equivalency range of the appended claims are intended to be embraced herein.

What is claimed is:

1. A method of treating a waste brine that contains sodium, sulfate and chloride and producing sulfate and chloride salt crystals comprising:
   directing the waste brine to a nanofiltration device and filtering the waste brine to produce a permeate stream and a reject stream;
   directing the reject stream to a first concentration unit and concentrating the reject stream;
   directing the concentrated reject stream to a Mirabilite crystallizer and producing via cooling crystallization hydrated sulfate salt crystals;
   melting the hydrated sulfate salt crystals to form an aqueous sulfate solution or a slurry;
   directing the aqueous sulfate solution or slurry to a sodium sulfate crystallizer and crystallizing anhydrous sulfate salts from the aqueous sulfate solution or slurry to form the sodium sulfate salt crystals;
   directing the permeate stream from the nanofiltration device to a second concentration unit and concentrating the permeate stream; and
   directing the concentrated permeate stream to a sodium chloride crystallizer and producing the sodium chloride salt crystals.

2. The method of claim 1 wherein the sulfate crystallizer produces a mother liquor and the method includes recycling the mother liquor from the sulfate crystallizer to the Mirabilite crystallizer.

3. The method of claim 1 including purging brine from the Mirabilite crystallizer and directing the purged brine to a waste backend crystallizer and producing a waste salt.

4. A coal-to-chemical or coal-to-liquid process that includes recovering sulfate and chloride salt crystals, the process comprising:
   converting coal-to-chemical or liquid and producing a waste brine which contains sodium, sulfate and chloride;
   directing the waste brine to a nanofiltration device and filtering the waste brine to produce a permeate stream and a reject stream;
   directing the reject stream to a first concentration unit and concentrating the reject stream;

directing the concentrated reject stream to a Mirabilite crystallizer and producing via cooling crystallization hydrated sulfate salt crystals;

melting the hydrated sulfate salt crystals to form an aqueous sulfate solution or a slurry;

directing the aqueous sulfate solution or slurry to a sodium sulfate crystallizer and crystallizing anhydrous sulfate salts from the aqueous sulfate solution or slurry to form the sodium sulfate salt crystals;

directing the permeate stream from the nanofiltration device to a second concentration unit and concentrating the permeate stream; and directing the concentrated permeate stream to a sodium chloride crystallizer and producing the sodium chloride salt crystals.

* * * * *